Aug. 23, 1938.    W. E. KEMP    2,127,521
GOVERNOR MECHANISM
Original Filed Oct. 13, 1932    4 Sheets-Sheet 1
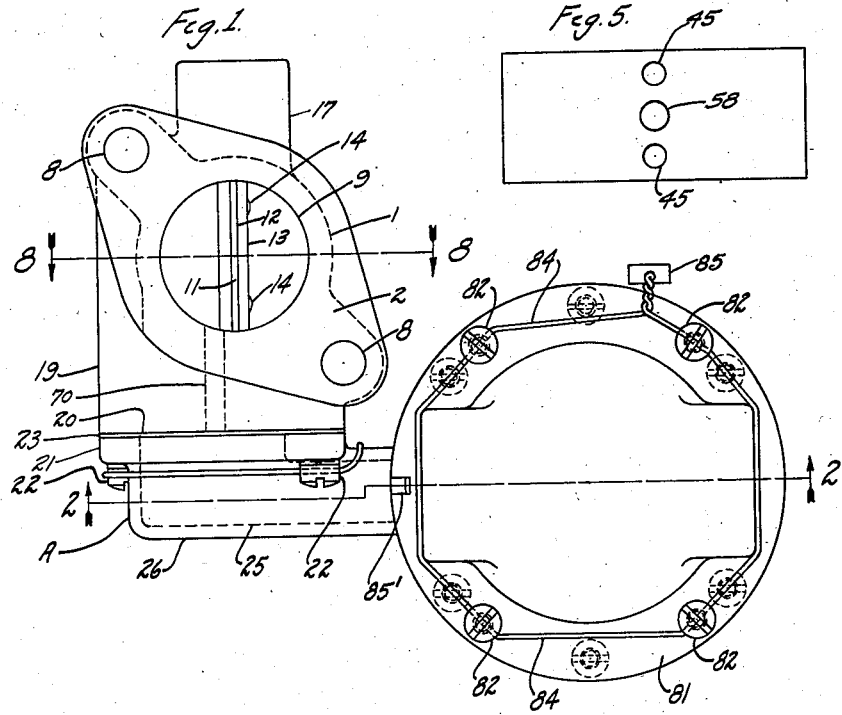
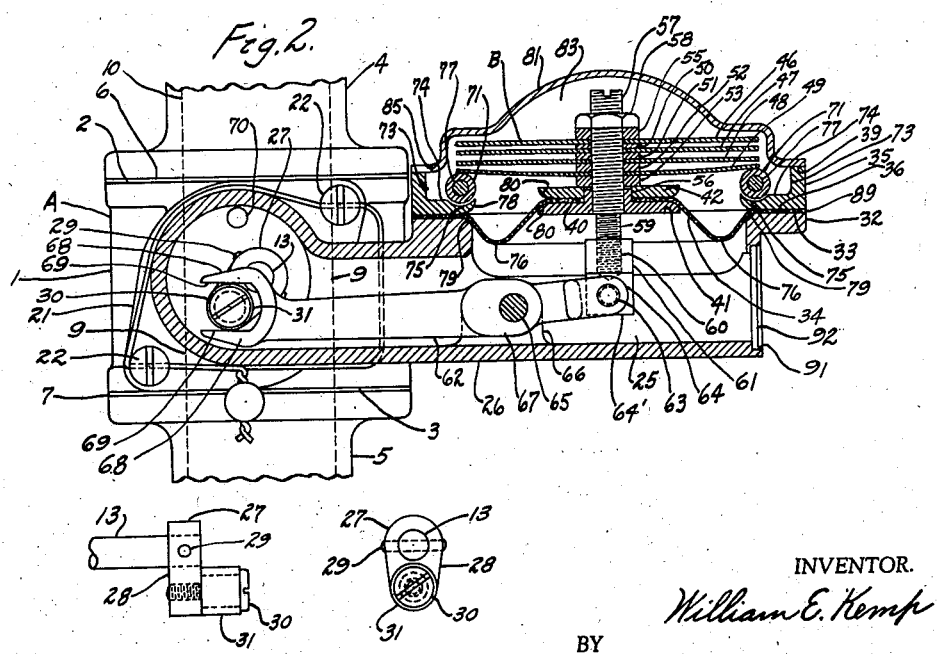
INVENTOR.
William E. Kemp
BY
George B. Ingersoll
ATTORNEY.

Aug. 23, 1938.                    W. E. KEMP                        2,127,521
                              GOVERNOR MECHANISM
                    Original Filed Oct. 13, 1932    4 Sheets-Sheet 2
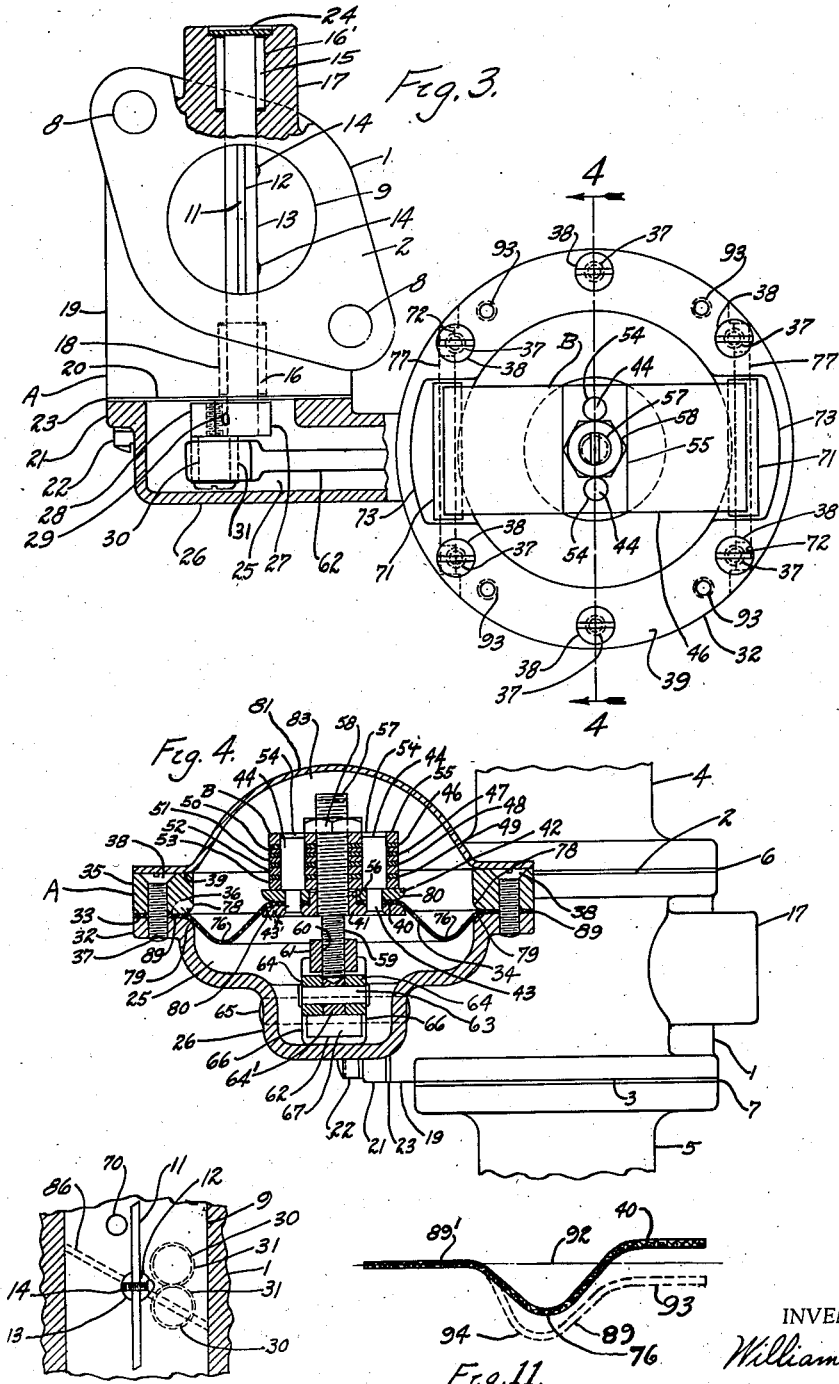
INVENTOR.
William E. Kemp
BY
George B. Ingersoll.
ATTORNEY.

Aug. 23, 1938.  W. E. KEMP  2,127,521
GOVERNOR MECHANISM
Original Filed Oct. 13, 1932  4 Sheets-Sheet 3

INVENTOR.
William E. Kemp
BY
George B. Ingersoll.
ATTORNEY.

Aug. 23, 1938.  W. E. KEMP  2,127,521
GOVERNOR MECHANISM
Original Filed Oct. 13, 1932  4 Sheets-Sheet 4

INVENTOR.
William E. Kemp.
BY Harness, Dickey, Pierce & Hann,
ATTORNEYS.

Patented Aug. 23, 1938

2,127,521

UNITED STATES PATENT OFFICE 2,127,521

GOVERNOR MECHANISM

William E. Kemp, Detroit, Mich., assignor to Pierce Governor Company, Anderson, Ind., a corporation of Indiana Application October 13, 1932, Serial No. 637,612
Renewed June 9, 1937

9 Claims. (Cl. 267—1)

My invention relates to improvements in governors for use with internal combustion engines in which the speed control mechanism of the governor is actuated by the vacuum or difference in pressure which exists in the intake manifold, together with its connecting chambers, of an internal combustion engine, at a point above the engine throttle valve, and pressure of the outside atmosphere; and the objects of my improvement are, first, to provide a governor of simple, compact, and economical design and which will operate efficiently over long periods of time to accurately govern the speed of an internal combustion engine without surging, hunting, or permitting any loss of power; second, to provide a governor that is not adversely affected in its operation, as in the prevalent type of governor, by the presence of abrasives and other elements; third, to provide a governor having a diaphragm actuated by vacuum; fourth, to provide a governor having a threadably engaged mechanism providing an extremely fine or vernier adjusting movement; fifth, to provide a governor having its control mechanism operated by an actuated flexible diaphragm; sixth, to provide a governor having a vacuum chamber which acts as a dash pot for insuring dynamic stability of the governing mechanism; seventh, to provide a governor having a balancing resistance spring of the plate type; eighth, to provide a governor having a balancing resistance unit including a plurality of spaced plate springs; ninth, to provide a governor having a balancing resisting spring of the cantilever type; tenth, to provide a governor having a vacuum actuated diaphragm of relatively large area and relatively small movement; eleventh, to provide a governor having a vacuum actuated diaphragm with a relatively large convoluted portion to provide maximum efficiency; twelfth, to provide a governor having a plurality of progressively contacting plate springs; thirteenth, to provide a governor having a vacuum actuated diaphragm possessing the property of transmitting forces applied to it without undue change in character of said forces as it moves a throttle valve to a closed position; fourteenth, to provide a governor having a vacuum actuated diaphragm with resistance means adapted to exactly balance the force actuating said diaphragm; fifteenth, to provide a governor having non-isochronous governing characteristics relative to the governed speed of the engine between its full and no load speed operation; sixteenth, to provide a governor having an air tight enclosure between a vacuum chamber and its balancing resistance mechanism; and seventeenth, to provide a governor having balancing resistance spring members engaging rotatively mounted spring seats.

I attain these objects by mechanism illustrated in the accompanying drawings, in which,—

Figure 1 is a plan view of the governor assembly; Fig. 2, a vertical section of the governor mechanism taken on the line 2—2, Fig. 1; Fig. 3, a plan view of the governor mechanism with its cover removed and with portions of its housings broken away to disclose portions of the governing mechanism; Fig. 4, a side elevation of the governor assembly with a vertical section of the vacuum actuated mechanism on the line 4—4, Fig. 3; Fig. 5, a plan view of one of the plate springs; Fig. 6, a side elevation of the throttle valve shaft and its lever and roller members assembled thereon; Fig. 7, an end elevation of the throttle valve shaft and its lever and roller members as disclosed in Fig. 6; Fig. 8, a vertical section of the throttle valve in its housing on the line 8—8, Fig. 1; Fig. 9, a plurality of curves plotted in variables of the vacuum exerted upon the diaphragm and the movement of the actuated diaphragm; Fig. 10, a plurality of curves plotted in variables of the vacuum pull on the diaphragm and the movement of the actuated diaphragm; Fig. 11 is an enlarged fragmentary sectional view of the diaphragm in its initial position, its position at the limit of movement being shown in dotted outline.

Similar numerals refer to similar parts throughout the several views.

Figure 10:
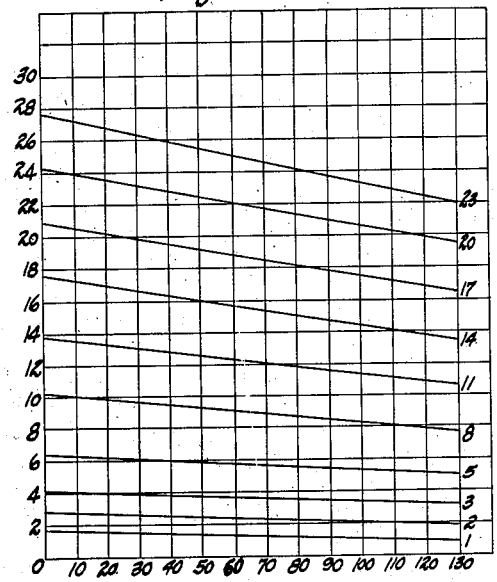

The housing 1 is provided with the flange surfaces 2 and 3 which are suitably mounted between the intake manifold of the internal combustion engine, a section of the intake manifold being indicated at 4, and the carburetor with which the internal combustion engine is equipped, a portion of the carburetor being indicated at 5, Fig. 2. A gasket 6 may be interposed between the flange surface 2 and the intake manifold 4 and the gasket 7 may be interposed between the flange surface 3 and the carburetor 5. The housing 1 is provided with the holes 8 for securing the governor assembly A and the carburetor 5 to the intake manifold 4.

The governor assembly A is secured between the intake manifold 4 and the carburetor 5 in such manner that the direction of the flow of the combustible mixture of fuel will be through the carburetor 5 and through the housing 1 from the flange surface 3 to the flange surface 2, said mixture passing through the passage or bore 9, of the housing 1 into the passage 10 of the intake manifold 4.

The housing 1 contains the throttling means which may be in the form of the conventional throttle or butterfly valve 11 which may be secured in the slot 12 in the shaft 13 by the screws 14. The throttle shaft 13 is suitably mounted in the bearings 15 and 16 which are of the antifriction type and may be of the roller type as disclosed or of the conventional ball type. The bearing 15 is mounted in the bore 16' of the boss 17, which projects from the body of the housing 1 while the bearing 16 is mounted in the bore 18 in the boss 19 which projects from the body of the housing 1 and is provided with the surface 20 to which is secured the flange 21 of the housing 26 by the screws 22, the gasket 23 being interposed between the surface 20 and the surface of the flange 21. The bore 16' in the boss 17 is closed at its outer end by the disc plug 24.

The shaft 13 projects into the chamber 25 of the housing 26 and the hub 27 of the lever 28 is secured thereon by the pin 29. The shoulder pin 30 is threadably secured in the lever 28 and the roller 31 is rotatably mounted on said shouldered pin 30.

The housing 26 is provided with the circular flange 32 which is provided with the surface 33 against which is clamped the outside or peripheral portion of the diaphragm 34 by the annular housing or ring 35, the annular housing 35 being provided with the surface 36 for contacting the diaphragm 34, the annular housing 35 and the diaphragm 34 being secured to the flange 32 of the housing 26 by the screws 37, the heads 38 of the screws 37 being located flush, as by countersinking, with the surface 39 of the annular housing 35.

The central portion 40 of the diaphragm 34 is clamped between the washers 41 and 42 by means of the rivets 43 which are each provided with the shouldered portion 44 which extends through the holes 45 of the springs 46, 47, 48, and 49, which may be normally flat of the plate or leaf type and also of double cantilever construction as disclosed. The shouldered portion 44 of the rivets 43 also extend through suitable and similar holes in the spacers 50, 51, 52, and 53 and into the holes 54 of the plate 55.

The washer 41 is provided with the boss 56 which extends and fits within an opening in the washer 42, the boss 56 being provided with a threaded hole engaged by the screw 57 which further extends through the holes 58 of the springs 46, 47, 48, and 49 and through similar holes in the spacers 50, 51, 52, and 53 together with a similar hole in the plate 55, the screw 57 and the nut 58 securing the springs, 46, 47, 48, and 49, the spacers 50, 51, 52, and 53, the plate 55, the washers 41 and 42, and the diaphragm 34 together in the clamped assembly B, said springs being separated from each other by said spacers. The portion 59 of the screw 57 is reduced in diameter below that of its portion extending through said washers, spacers, springs, plate, and nut, said portion 59 being threaded to engage the threaded hole 60 in the nut member 61. It is to be noted that the number of threads per inch on the portion 59 of the screw 57 and in the threaded hole 60 is less than the number of threads per inch on the upper portion of said screw threadably engaging the washer 41 and the nut 58. Thus my invention provides for an extremely fine and vernier adjustment of the position of the diaphragm 34, one revolution of the screw 57 causing said diaphragm 34 to move a distance equal to the difference in the pitch of the threads on the portion 59 and on said upper portion of the screw 57, this extremely accurate and fine adjustment being accomplished by the use of substantial and standard pitches of the threads.

The nut member 61 is pivotally connected with the lever 62 by the pin 63 which extends through and is suitably retained in the fork portions 64 of the lever 62 and in the boss portion 64' of the nut member 61, said boss portion 64' fitting between the fork portions 64. The lever 62 is pivotally mounted on the shaft 65 which is supported within holes extending within the wall portions of the housing 26 and the bosses 66 connected to said wall portions, the boss 67 of the lever 61 extending between the bosses 66. The bosses 66 and the boss 67 may be constructed with an elongated shape, as disclosed to permit the location of the shaft 65 to be varied in its position relative to the opposite ends of the lever 62 to accomplish varying leverage movements of said lever 62 to accommodate governor installations on different engines.

The lever 62 is further provided with the fork portions 68 which are further provided with the surfaces 69 which are engaged by the roller 31 which is rotatively mounted on the shouldered pin 30. The hole or orifice 70 extends through the boss 19 and constitutes a connecting passage between the chamber 25 of the housing 26 and the bore 9 of the housing 1.

The outer ends of the spring 49 normally rest upon antifriction spring seats constructed by rotatively mounting the rollers 71 on the shafts 77 which may be suitably secured in the holes 72 extending through the wall portions of the annular housing 35. The annular housing 35 is provided with the recesses 73 which contain the rollers 71, the ends of the springs 46, 47, 48, and 49 extending into said recesses 73, said recesses 73 being closed at their lower sides by the flange 74 which is constructed with the semi-cylindrical shaped recess 75 which provides operating clearance for the rollers 71.

It is also to be noted that the diaphragm 34 is provided with an exceptional amount of slack or convoluted portion, which is designated at 76, when the governor mechanism is in the position, as disclosed in Fig. 2, said position corresponding to the full open position of the throttle valve 11 as disclosed by the full lines of said valve 11 in Fig. 8.

The large area of the convoluted portion 76 existing at the beginning of the working stroke of the diaphragm 34 together with the extremely short length of its stroke, which may be maintained at approximately a maximum of one-eighth of an inch in an installation such as disclosed in the drawings, eliminates all excessive tension in the diaphragm 34 and thus insures that the diaphragm 34 will always be operated with such minimum stresses therein as will enable it to operate over long periods of time without developing trouble, and without offering undue resistance to movement.

The inside edge of the surface 36 of the annular housing 35 is provided with the radius 78, the inside edge of the surface 33 of the housing 26, is provided with the radius 79, and the outer edges, of the washers 41 and 42, adjacent the diaphragm 34, are provided with the radii 80 to eliminate any tendency of abrasion or injury to the diaphragm 34 as it is engaged, by said edges, in its operative movement.

The cover or cap 81 is secured in contact with the surface 39 of the annular housing 35 by the screws 82, said cover 81 thus closing the chamber 83 above the diaphragm 34 and sealing the diaphragm 34, the spring assembly B, and the screw 57 against tampering. The heads of the screws 82 may be provided with holes to receive the sealing wire 84 therethrough, as disclosed in Fig. 1, said sealing wire 84 being provided with the seal 85 to insure the prevention of unauthorized tampering with the adjustment of the screw 57.

The cover 81 may be provided with one or more radial slots 85' extending from its peripheral edge to a point beyond the inside edge of the surface 39 of the annular housing 35, said slot 85 thus forming an aperture through which atmospheric pressure is admitted at the chamber 83 and permitted to act upon the upper surface of the diaphragm 34, the space below the diaphragm 34 forming a part of the chamber 25 which communicates with the space above the throttle valve 11 through the hole 70, the chamber 25 thus being in direct communication with the passage 10 of the intake manifold 4.

When my governor mechanism is installed on an engine, and the position of the throttle valve 11 is varied progressively from its wide open position, as disclosed by full lines in Fig. 8, to a nearly closed position, while the speed of the engine is maintained constant by varying the load upon it, it is found that the pressure above the throttle valve 11 decreases as the valve 11 moves toward a fully closed position, said fully closed position being indicated by the dotted lines 86, Fig. 8. However the variation in pressure above the throttle valve 11 is not directly proportional to its movement, or to the movement of the diaphragm 34, which, in my invention, is substantially proportional to the movement of the throttle valve 11.

Figure 9:
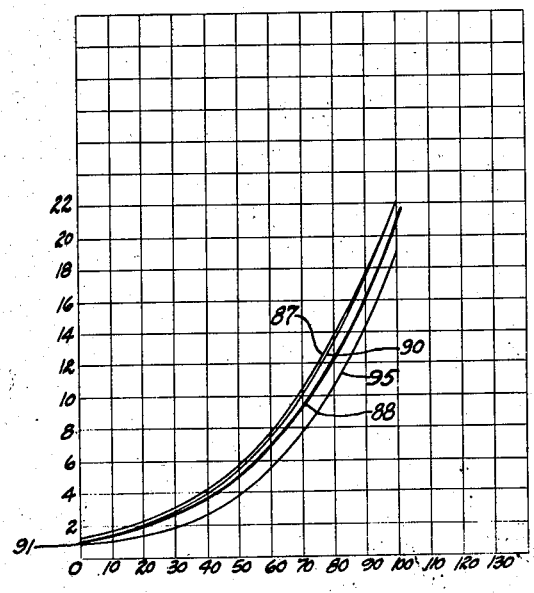

The relation of this existing pressure above the throttle valve 11, measured in terms of vacuum and movement of diaphragm at constant speed is disclosed in the chart, Fig. 9, by the curve 95. This curve of the chart, Fig. 9, is plotted in variables of the vacuum exerted upon the diaphragm 34 in terms of inches of mercury and movement of the diaphragm measured in thousandths of an inch. The abscissae represent the movement of the diaphragm 34 and the ordinates represent the vacuum exerted upon the diaphragm 34. The curves 87, 88 and 90 are plotted in terms of pull upon the diaphragm 34 in pounds and movement in thousandths of an inch. The abscissae represent the movement in thousandths of an inch and the ordinates represent the pull in pounds. It is to be understood that the term vacuum, as herein used will always be interpreted to mean the difference between the pressure existing above the throttle valve 11 and atmospheric pressure.

Thus it will be understood that, since the space above the diaphragm 34 is subjected to atmospheric pressure, the curve 95, in Fig. 9, discloses the unit pressure acting upon every unit surface of the diaphragm 34, also said curve 95 discloses that the pressure above the throttle 11 is lower than atmospheric pressure at all diaphragm positions, i. e. at all engine loads. It therefore follows that at constant speed and decreasing load, the atmospheric pressure tends to move the diaphragm 34 downwardly at all of its positions, and this in turn causes the throttle valve 11 to move toward a closed position. The actual net force resulting from the vacuum pull upon the diaphragm depends upon the size and shape of the diaphragm. I have found that a flat, non-convoluted diaphragm requires a relatively great force to move it away from a mean position of equilibrium and that this force increases as the displacement from position of equilibrium increases, and its magnitude even for a small displacement, such as used in this device, may become larger than the applied vacuum pull. Also the rate at which this force varies with respect to diaphragm movement is not suitable for proper balance of vacuum and other forces, inasmuch as it assists the vacuum force when the valve is at or near a wide open position and opposes the vacuum force when the valve is at or near a closed position, making it unsuitable for use in a governing device. The convoluted diaphragm 34 herein disclosed eliminates the above mentioned difficulty.

The curves in Fig. 10 disclose how the force upon the diaphragm 34 varies when it is subjected to a constant nonpulsating vacuum and progressively moved downwardly through its entire range of movement. The several curves on the chart, Fig. 10, show this relationship existing at varied vacua.

The curves of the chart, Fig. 10, are plotted in variables of the vacuum pull on the diaphragm 34 in terms of pounds and movement of the diaphragm in thousandths of an inch, the numerals at the right of the ends of the curves denoting values of constant vacuum in inches in mercury. The abscissae represent the movement of the diaphragm 34 and the ordinates represent the vacuum pull exerted on the diaphragm 34.

It will be noted from the curves of Fig. 10, that the force upon my convoluted diaphragm at constant vacuum, varies uniformly over its entire range of movement and that the slope of the curves is relatively small, that is, there is no great difference between the force transmitted by the diaphragm, at constant vacuum, as it is displaced through its range of movement. Thus in Fig. 9, the curve 87, shows the actual force transmitted by the diaphragm as a result of being subjected to the variable vacuum shown in Fig. 9 by the curve 95. The curve 88 shows the actual force transmitted by the diaphragm when subjected to a similar constant speed vacuum obtained at a somewhat lower constant engine speed.

If a resistance is provided such that at any diaphragm position the resistance will exactly balance the force acting upon said diaphragm, as obtained from curve 87 of Fig. 9, the governor will tend to maintain a constant engine speed.

It is known that an attempt to obtain isochronous operation invariably results in surging, unless special means, such as dash pots, gag pots, or similar means are provided. In order to insure stable operation in my invention, two stabilizing elements in my construction are thus provided; namely, the novel spring assembly B, and an air dash pot.

Referring again to the curves in Fig. 9, a spring resistance which exactly balances curve 90 is provided. The value of the force of the curve 90 at full load is the same as the corresponding force on the curve 88. Thereafter the ordinates of curve 90 increase more rapidly than the ordinates of curve 88, until at no load, the ordinates of the curve 90 coincide with the ordinates of the curve 87. It follows from this that the rate of change of force with respect to the deflection of the spring resistance is always greater at, any point, than a similar rate produced by either of the curves 87 or 88.

This results in the development of forces which tend to check any instantaneous tendency toward harmonic speed fluctuation or surging of the governing mechanism.

The governing immediately becomes non-isochronous and a definite difference in the speed of the governed engine is introduced between its full and no load operation, that is, the speed gradually increases as the load upon the engine diminishes.

It will be noted, that the arrangement of the various parts of my device is such that relatively a large size of diaphragm may be used without unduly increasing the height of the governor assembly A. The large area of the diaphragm 34 provides relatively powerful operating forces which make it possible to maintain a small difference between the full load and no load speed of the governed engine.

Referring again to the drawings it will be noted that the volume of the air contained in the chamber 25 of the housing 26, below the diaphragm 34, is relatively large. Inasmuch as no air can escape from the chamber 25, except through the orifice 70, it follows that any tendency toward rapid cyclic movements of the diaphragm 34 will be checked and eliminated by the production of resisting pressures in the elastic medium below said diaphragm 34, in other words, the chamber 25 below the diaphragm 34 and its associated orifice 70 form a dashpot. The effect of this dash pot in causing dynamic stability of my governor mechanism may be varied at will by varying the size or length of orifice 70.

Referring again to Fig. 9, it is to be noted that the curve 90 is substantially straight at its lower end, and that said straight portion is continued as a curve of gradually increasing radius of curvature with no abrupt changes in said radius of curvature of the curve 90. If abrupt changes in radius of curvature were present, such as those present in a curve which would be developed by drawing tangents to the curve 90 at various points, it follows, that some portions of this curve, composed of tangents, would have a rate of change of force with respect to deflection equal to or less than at a corresponding portion of the curves 87 or 88. Accordingly the governor mechanism would tend to operate isochronously at said positions and hunting or surging would inevitably follow. It is therefore apparent that if a governing mechanism is to provide a close and stable speed control, the balancing resistance curve must have no abrupt changes in curvature, such a curve being disclosed at 90 substantially as shown in Fig. 9.

In order to produce such a desired balancing resistance an assembly B comprising the flat springs 46, 47, 48, and 49 and the spacers 50, 51, 52, and 53 are provided as disclosed. The rate of change of force with respect to deflection of the lowermost spring 49, corresponds exactly to the lower portion of the curve 90 of Fig. 9. After the diaphragm 34 is actuated downwardly by atmospheric pressure through a certain length of movement, the ends of the spring 48 contact with the end portions of the lowermost spring 49 and as the downward movement of the diaphragm progresses, the distance between the point of contact of the spring 48 and the center line of the diaphragm 34 progressively diminishes, thus causing a gradual decrease in the effective length of the spring 48 and a consequent gradual increase in the combined rate of resistance of the spring 48 and the lowermost spring 49. Further downward movement of the diaphragm 34 brings into action, successively, the spring 47 and then the spring 46.

By properly selecting the dimension of said springs and the thickness of said spacers, any curve, of the general character shown by the curve 90 of Fig. 9, may be developed.

The sensitiveness of a governor mechanism in responding to small speed fluctuations depends, among other things, upon the amount of work done by its power element, per stroke, as compared to the negative work which must be done in overcoming friction per stroke. Since it is impossible in a mechanism of this type, to eliminate friction entirely, it is evident that for a given sensitiveness, a definite amount of work must be done by the power element of said governor mechanism. Work being the product of force and distance, it follows that since the arrangement of parts in my invention is such that a large size diaphragm 34 may be used, the operating stroke is relatively short. It also is evident that the deflection of the balancing springs will be short, and consequently, a relatively small adjustment is required to produce a large rate of change in speed at which the governor will control its associated engine. Accordingly, it is possible to adjust my governor mechanism to operate with a great range of engine speed without sacrificing compactness of the governing unit.

The method used in adjusting my invention to operate on any engine is as follows: the governor assembly A is mounted between the carburetor 5 and the intake manifold 4 of the engine and the force upon the diaphragm 34, is measured at various positions of the diaphragm 34, while the desired speed of the engine is maintained constant by load adjustment. The valve (not shown) of the carburetor 5 is maintained throughout this operation at a wide open position. An additional reading of the force upon the diaphragm 34 is then taken, with the throttle 11 maintained in an open position corresponding to an engine speed slightly below the desired engine speed. The results of this operation are then plotted, thus furnishing the equivalent of the curve 87, Fig. 9. The additional reading of force taken at full load and at a slightly lower speed corresponds to the beginning of the lower portion of the curve 88, Fig. 9. A governing curve, similar to the curve 90 of Fig. 9, is then drawn in such a manner, that its lower end starts at the last force reading, corresponding to the point 91a, as disclosed in Fig. 9, and further so that it gradually approaches the constant speed force curve, substantially as shown by the curve 90, Fig. 9. Springs and spacers are then selected to balance the developed governing curve 90, Fig. 9.

The governing mechanism herein disclosed eliminates all operating difficulties caused by abrasives and the leakage of air, as the diaphragm 34 prevents air leakage and is not retarded in its movement by dust or dirt. Because of the novel shape of the diaphragm 34, its rate of resistance to movement is very low. The structure of the balancing springs and the method of their selection provides a smooth continuous balancing resistance, which together with the dashpot action of the chamber 25, insures responsive and accurate governing control and also furnishes a wide range of speed adjustment. Also inasmuch as no retardation or restriction of mixture flow is set up, these desired results are obtained without the loss of engine power.

It is also to be especially noted that the design and assembly of the balancing springs of the spring assembly B is such that no means is provided or is necessary for limiting the balancing resistance of the springs at any time either individually or progressively. Each of the balancing springs of my invention are capable of and are adapted to provide a continuous and uninterrupted progressively increasing resistance to the movement of the diaphragm 34 throughout the total length of its force-exerting stroke after each of said balancing springs begin to exert a balancing resistance.

It is also to be noted that the housing 26 is constructed with the recess 91b which provides an entrance into the chamber 25 when the disc plug 92 is removed, said disc plug 92 normally closing the chamber 25 by removing the disc plug 92, knocking out the shaft 65, and threadably disconnecting the portion 59, of the screw 57, from the nut member 61, the lever 62 together with its connected nut member 61 may be withdrawn through the opening of the recess 91b, thus providing a novel and efficient disassembly of portions of the governing mechanism for service or other requirements without the necessity of the removal of the housing 26 from the housing 1.

The tapped holes 93 in the annular housing 35, as disclosed in Fig. 3, permits the removal of the screws 82 and the cover 81 for inspection or service requirements without disturbing the annular housing 34 or the spring assembly B.

It is also to be noted that the throttle valve 11 is of the statically balanced type, the shaft 13 extending transversely through the vertical center of the bore 9 of the housing 1, said throttle valve 11 having approximately the same length on each side of the shaft 13.

It is to be especially further noted that the peripheral portion 89', of the diaphragm 34, which is clamped between the surfaces 33 and 36 extends in a plane so that the neutral axis of said peripheral portion 89' is indicated by the line 92, in Fig. 11. The central portion 40 which is clamped between the washers 41 and 42 is so located above the line 92 at one end of its movement that said central portion 40 will be approximately at the position indicated by the dotted lines 93, at the other end of its movement, the convoluted portion 76 having assumed the position indicated by the dotted lines 94. It is thus to be noted that the effective movement of the central portion 40 is approximately equal on both sides of the line 92, said central portion 40 having a relatively short movement which, due to the convoluted portion 76, sets up a minimum of flexing stresses in the diaphragm 34 and insures that the vacuum forces exerted thereon will be utilized with a very minimum of loss of the effective vacuum forces exerted on the diaphragm 34, also further insuring that the diaphragm 34 will operate over a long period of time without injury. It is also to be noted that the convoluted portion 76 will provide a much more efficient means of transmitting the forces imposed thereon by vacuum, to the governing mechanism connected therewith, than would be the case if the section of the convoluted portion 76 was constructed with a cross section having a lesser depth, it having been found by repeated tests that if said cross section is reduced in depth to have a lesser amount of material in the convoluted portion 76, the effective area of the diaphragm is reduced with consequent greater loss between the vacuum forces developed in the engine and the actual net force developed by the diaphragm 34 due to the imposition thereon of the vacuum forces. Thus it will be seen that the diaphragm 34 actuated by vacuum in my invention represents a distinct advance in operating efficiency over a diaphragm having a normal amount of material connecting a fixed peripheral portion with a central clamped portion. It is to be noted that the overall height of the convoluted portion 76 of my invention is approximately twice the length of the stroke of the diaphragm 34.

Figure 12:
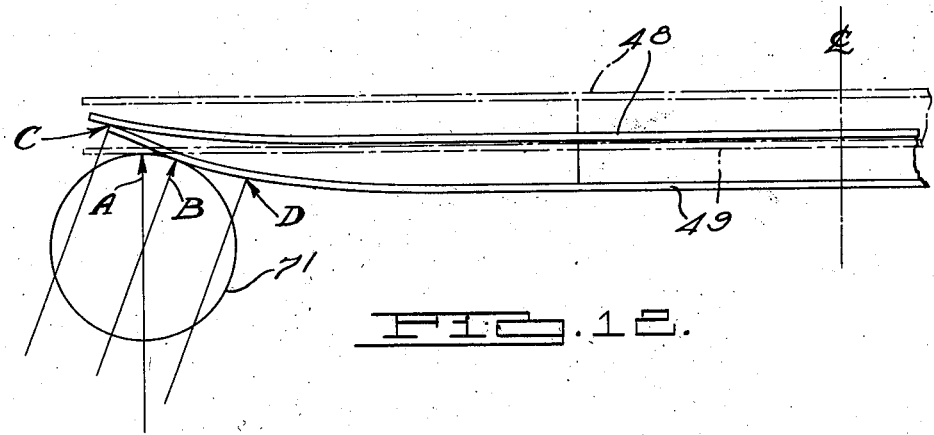
Fig. 12 is an enlarged diagrammatic view showing how the effective length of the leaf spring is reduced upon movement caused by increased reduction of pressure.

Fig. 12 illustrates the manner in which the effective length of the leaf spring 49 is shortened during movement caused by reduction of pressure. When in a no load position, shown by dotted lines, the free end of the spring 49 will be supported on the roller 71 at the position indicated by the arrow A, and project slightly therebeyond. When the spring has been flexed to the position shown in full lines, it will contact with the roller at the position indicated by the arrow B, which is closer or nearer to the centerline of the spring and its place of anchorage. Furthermore, it is to be particularly noted that the next adjacent spring 48 now contacts at C with the end of spring 49 which projects beyond the point of contact B, thus exerting a leverage on the protruding end which causes the spring 49 to have an effective length the same as though it rested on the roller 71 at the point indicated by the arrow D. As pressure is increased at point C it is negatived at the point D.

Regarding the specific construction and arrangement of the leaf springs, it is to be understood that the invention may be applied to many and diverse uses and is not in any way limited to governors, but is equally useful in many arts totally unrelated to the subject-matter of the present application.

Figure 13:
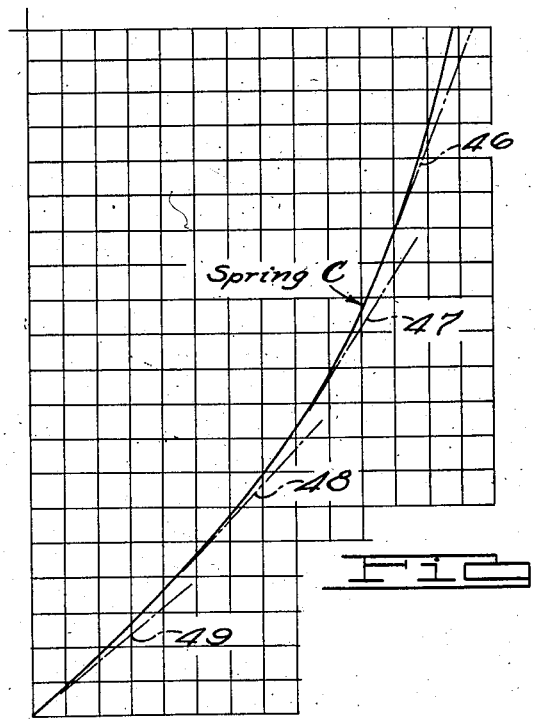
Fig. 13 is a view of a plotted curve illustrating how the resisting force of each spring is modified by being increased so as to cause the resistance curve of the spring assembly to bear a predetermined relation to the suction curve of the motor.

Fig. 13 illustrates how each of the leaf springs 49, 48, 47 and 46 becomes successively effective in the order stated during the total range of movement caused by reduction of pressure. The normal straight line curve of resisting force of each of the springs is shown in dotted lines and it is to be noted that the points at which the springs become effective are tangent to the desired curve. Then, instead of departing therefrom as would normally be the case, the resistance of each spring is progressively increased so as to produce a smooth curve with the action of one spring blending into the action of the next. It is desirable that the spring resistance curve be as near alike the contour of the suction curve as possible, and be smooth and regular from minimum to maximum position.

I claim:

1. A yielding resistance unit comprising a plurality of spaced leaf springs of progressively increasing resistance, means for anchoring intermediate portions of said springs in juxtaposition and thus providing free ends, support means for engaging said opposite free ends, and means for moving said springs and support means relatively to each other to cause a flexing of said springs securing successive operative and sliding engagement of each free end with said support means, said springs and support means being constructed and arranged so as to progressively increase the resistance of the individual springs successively during such flexing movement, the total effect being to obtain a substantially parabolic-force-deflection curve.

2. A yielding resistance unit comprising a leaf spring mounted on a base support with a free end extending therefrom, a second leaf spring of substantially equal length in spaced juxtaposition to said first spring, a support for engaging the free end of the first spring inward from the end thereof so that the tip end protrudes therebeyond and means for moving said supports relatively to each other for flexing said first spring and thereby effecting an increase in its deflection rate by bringing its point of contact on the support nearer to the point of mounting on the base support, said second spring contacting with the protruding end of said first spring upon continued deflection of said first spring and, by engagement therewith, tending to further increase the deflection rate of said first spring.

3. In combination, a support, a plurality of leaf springs of substantially equal length mounted on said support, means spacing said springs from each other on said support, and a stop member movable relative to said support adapted for sliding contact with one of said springs adjacent the free ends thereof, the whole being so constructed and arranged that continued relative movement between said support and stop member in one direction will cause said springs to successively contact with the next adjacent springs immediately adjacent the previous spring-stop contact portion thereof.

4. In combination, a support, a plurality of substantially normally flat superposed leaf springs of substantially equal length mounted on said support, means spacing said springs from each other on said support, and a stop member relatively movable with respect to said support positioned to engage an end of one of said springs adjacent its free end, said springs being so spaced from one another that upon continued relative movement in one direction from a free position of said springs said springs will be brought into successive contact with each other adjacent their free ends.

5. In combination, a support and a stop member relatively movable with respect to each other, a spring assembly comprising a plurality of superposed leaf spring members mounted on said support, means spacing said springs from each other on said support by distances successively decreasing from one end of said spring assembly toward the other end thereof, said stop member positioned to engage one of said springs at one end of said spring assembly at a point outwardly from the point of connection of said one of said springs with said support.

6. In combination, a support, a plurality of elongated leaf springs mounted on said support, means spacing said springs from each other on said support, and a stop member movable relative to said support adapted for contact with one of said springs, the whole being so constructed and arranged that continued relative movement between said support and stop member in one direction will cause said springs to successively contact with the next adjacent springs immediately adjacent the previous spring-stop contact portion thereof, and said stop member being arranged inwardly of the free end of said one of said springs whereby when the tip of said one of said springs contacts with the next adjacent of said springs the effective deflection rate of said one of said springs will be increased.

7. In combination, a support and a stop member relatively movable with respect to each other, a spring assembly comprising a plurality of superposed leaf spring members mounted on said support, means spacing said springs from each other on said support by distances successively decreasing from one end of said spring assembly toward the other end thereof, said stop member positioned to engage one of said springs at one end of said spring assembly at a point outwardly from the point of connection of said one of said springs with said support, and said stop member comprising a roller arranged with its axis of rotation in a plane parallel to the planes of said springs and perpendicular to the length thereof.

8. The yielding resistance unit, comprising a leaf spring mounted on a base support with a free end extending therefrom, a second leaf spring in spaced juxtaposition to said first spring, a support for engaging the free end of the first spring inward from the end thereof so the tip end protrudes beyond the point of contact therewith, and means for moving said supports relatively to each other for flexing said first spring and thereby effecting an increase in its deflection rate by bringing its point of contact on the anti-friction support nearer to the point of mounting on the base support, said second spring contacting with said first spring outwardly from the base support and of the point of contact of the first spring with said second-mentioned support upon continued deflection of said first spring, and by engagement therewith, tending to further increase the deflection rate of said first spring.

9. In combination, a support, a plurality of leaf springs mounted on said support, means spacing said springs from each other, and a stop member adapted for contact with the closest spring, the whole being so constructed and arranged that upon relative movement of a plurality of springs in one direction toward the stop member said springs will successively contact with the next adjacent springs, said stop member being arranged inwardly of the free end of the initially contacted spring, whereby when the effective end of other springs contacts with the next adjacent of said springs the effective deflection rate of the support contacted spring will be increased, and each of the spring contacting spring effective deflection rate will be increased.

WILLIAM E. KEMP.